United States Patent Office 3,208,998
Patented Sept. 28, 1965

3,208,998
CYANOETHYL AMYLOSE DERIVATIVES AND PROCESS FOR PREPARING SAME
Earl Eugene Fisher and James L. Harper, Decatur, Ill., assignors to A. E. Staley Manufacturing Company, Decatur, Ill., a corporation of Delaware
No Drawing. Filed Dec. 2, 1960, Ser. No. 73,190
9 Claims. (Cl. 260—233.3)

This invention is concerned with cyanoethyl amylose and with the cyanoethylation of amylose suspensions with acrylonitrile.

It is well-known that starch can be fractionated into two major fractions called amylose and amylopectin. Amylose is the straight chain portion of starch while amylopectin is the branched chain portion of starch. Various techniques have been developed to fractionate starch, and this invention is directed to the amylose fraction of starch.

Although the cyanoethylation of starch has been described in various patents and publications, such as United States Patent 2,316,129 to Bock et al., Canadian Patent 563,046 to Sample, and "The Reaction of Acrylonitrile with Macromolecular Hydroxy Substances," by MacGregor in Journal of the Society of Dyers and Colorists, vol. 67, page 66, the products and/or processes described have serious drawbacks. For example, the products prepared by Bock et al. are insoluble not only in water but even in aqueous alkali, the two most common and useful starch solvents. Although the cyanoethyl starch with a degree of substitution of about 0.05, which is disclosed by Sample, will paste in hot water, cyanoethylated starch prepared according to the suspension process of this patent with a degree of substitution between about 0.2 and 1.0 will not paste in water on heating, except in the presence of alkali. This is probably due to "case-hardening," that is, the surface of the granular product is highly substituted and thereby "hardened." The presence of alkali is undesirable since it causes deetherification and hydrolyzes some of the cyanoethyl groups.

The process recommended by MacGregor for starch requires large quantities of alkaline catalyst, which must be neutralized prior to the isolation of the cyanoethyl starch. Further, the starch ether must be freed from the electrolyte salts, which are formed during the neutralization of the catalyst, by dialysis or by means of ion exchange resins. MacGregor's subsequent use of ethanol and/or acetone to precipitate the cyanoethyl starch is undesirable because of its prohibitive cost. MacGregor also conjectures that amylose can be cyanoethylated. However, he does not disclose any specific example of how amylose can be cyanoethylated, nor are we aware of any reference that discloses a method of cyanoethylating amylose.

It is known that on cooling, aqueous pastes of unmodified starch, above about 3.5% solids concentration, set up and form more or less rigid gels; this property is greatly exaggerated in pure amylose solutions. Even 1% solutions of amylose will gel and will deposit practically the whole solute in the form of solid sediment in the course of a few days. This phenomenon, where water-insoluble, solid material which will not redisperse in water is formed, is called retrogradation. Cyanoethyl amylose having a degree of substitution below about 0.19 have the same tendency to gel and/or retrograde as the parent amylose. This serves to complicate the problem of preparing a separable non-gelling cyanoethyl amylose, which will dissolve easily in water, since, as previously stated, starch, cyanoethylated in suspension to a degree of substitution of about 0.2, will not paste in water at elevated temperatures except in the presence of alkali.

It is economically desirable to be able to prepare cyanoethyl amylose by a process in which the cyanoethyl amylose can be easily separated from the reaction mixture so that the salt contamination of the product is minimized. It is also desirable that the cyanoethyl amylose be capable of readily forming a stable aqueous solution.

A general object of this invention is to prepare cyanoethyl amylose by a suspension reaction. Another object is to prepare cyanoethyl amylose that can be isolated easily without the use of costly techniques, such as spray drying or precipitation from solution with large quantities of costly chemicals. Still another object is to prepare cyanoethyl amylose that not only is easily isolated but also readily forms aqueous solutions in available starch cooking equipment. A further object is to prepare cyanoethyl amylose having the foregoing properties and in addition being capable of forming solutions that have little or no tendency to retrograde or to gel on cooling to room temperature. A further object of this invention is to prepare a film-forming, non-gelling, non-retrograding, cold water-soluble cyanoethyl amylose by isolating said cyanoethyl amylose from its aqueous solutions.

In one aspect, this invention is a water-soluble cyanoethyl amylose film having a degree of substitution ranging from about 0.19 to approximately 0.88.

In a second aspect, this invention is a film-forming, cold water-soluble cyanoethyl amylose, which has little or no tendency to gel or to retrograde after dissolution in water.

In a third aspect, this invention is an initially water-insoluble cyanoethyl amylose, which dissolves in water at a temperature between 125° C. and 200° C. to form a solution having no tendency to gel or to retrograde on storage over a long period of time. The cyanoethyl amylose in this aqueous solution can be converted to a cold water-soluble powder by precipitation with an organic solvent or by evaporating the water on hot rolls or by spray drying.

In a fourth aspect, this invention is a method of forming an initially water-insoluble cyanoethyl amylose by reacting amylose with acrylonitrile followed by isolation of the cyanoethyl amylose by a simple separation technique involving the isolation of a solid from a liquid phase.

In another aspect, this invention is a method of forming cold water-soluble cyanoethyl amylose powders by dissolving the initially water-insoluble cyanoethyl amylose in water at elevated temperatures and then isolating the resulting cold water-soluble product by evaporation of the water on hot rolls or by spray drying or by precipitation with an organic solvent.

In still another aspect, this invention is a method of forming water-soluble films by dissolving either initially water-insoluble cyanoethyl amylose or cold water-soluble cyanoethyl amylose in water and then casting a film from the solution.

The cyanoethyl amylose of this invention is prepared by bringing acrylonitrile into contact with amylose in suspension in the presence of an alkaline catalyst. The suspension is maintained at a temperature of from 0° C. to 78° C. for at least about one hour and then neutralized. The resulting cyanoethyl amylose is then isolated. The product of this reaction is insoluble in water.

This water-insoluble cyanoethyl amylose can be isolated from the reaction medium by partitioning (e.g., filtration or centrifuging) and washed with water to remove water-soluble impurities. This step may be characterized as a solvent-exchange step. With or without such purification, the water-insoluble cyanoethyl amylose is dissolved in water by heating an aqueous dispersion of it to approximately 125° C. to 200° C. This solution can then be partitioned (e.g., by filtration or centrifuging) to remove water-insoluble impurities. A cold water-soluble product is isolated from the aqueous solution on hot rolls or by spray drying or by precipitation with an organic solvent.

The amylose used in this invention may be in a crystalline form, such as that prepared by the processes of Serial No. 2,160, filed January 13, 1960, United States Patents 2,515,095 and 2,515,096 or in an amorphous form, such as that prepared by the process of United States Patent 2,829,987. A spray dried form of amylose, which is partly crystalline and partly amorphous, is prepared by dissolving the crystalline form of amylose in from 5 to 20 times its weight of water at approximately 150° C. in an autoclave. The amylose, which has dissolved in the water, is then spray dried. A substantially amorphous amylose is prepared by precipitating the amylose from such aqueous solutions with acetone or other organic solvent known to precipitate starch from aqueous solution.

The amylose used in this invention may be prepared from any native starch or modified native starch. It is immaterial for the purpose of this invention whether the amylose fraction is from corn starch, potato starch, wheat starch, rice starch, tapioca starch, sago starch, etc. The modified starches include hypochlorite-oxidized starch, enzyme-treated starch, acid-hydrolyzed starch, etc.

The alkaline catalyst for this reaction may be any solvent soluble alkaline material. The catalyst may be an alkali metal hydroxide, such as sodium hydroxide and potassium hydroxide; an alkaline earth hydroxide, such as calcium hydroxide and barium hydroxide; a tetraalkyl ammonium hydroxide, such as tetramethyl ammonium hydroxide; a tetraalkyl phosphonium hydroxide, such as tetraethyl phosphonium hydroxide, pyridine, an alkali metal alcoholate, such as sodium alcoholate and potassium alcoholate, etc. While a catalyst concentration as low as 0.02 mole per mole of amylose may be employed, it is usually preferable to use catalyst concentrations in the range of 0.04 to 0.16 mole of catalyst per mole of amylose. When the catalyst concentration is too low, oxygen has a decided effect on the reaction. Under the conditions of the cyanoethylation reaction, the oxygen present in the reaction vessel appears to oxidize the amylose. Such oxidation of amylose discolors the product to an extent dependent on the amount of oxygen present. However, more important, the carboxyl groups of the oxidized amylose appear to neutralize the catalyst with the attendant curtailment of the reaction. Accordingly, when the concentration of the catalyst is approximately 0.02 mole per mole of amylose, it is usually necessary to run the reaction in the absence of oxygen, e.g., in an inert gas atmosphere. However, no matter how high the catalyst concentration is, it is usually preferable to keep the oxygen concentration within the reaction vessel at a minimum in view of the aforementioned possibility of discoloration.

Catalyst concentrations above 0.16 mole per mole of amylose can be used. However, it is preferable to use as low a catalyst concentration as possible in order to minimize the amount of salt formed when the catalyst is neutralized. The presence of excessive quantities of salts in the cyanoethyl amylose film reduces the tensile strength of the film. Although the concentration of salts may be reduced by either or both of the aforementioned partitioning steps, it is economically desirable to avoid these steps. With relatively pure amylose and a low concentration of catalyst, both partitioning steps can be omitted; when crude amylose is used, the first partitioning step can be omitted when low catalyst concentrations are used.

Furthermore, the presence of high concentrations of catalyst may result in partial hydrolysis of cyanoethyl amylose to carboxyethyl amylose as well as the solubilization of the suspended cyanoethyl amylose when water is used as the suspension medium. For example, when approximately one mole of catalyst was used per mole of amylose, approximately 50% of the suspended cyanoethyl amylose went into solution during the cyanoethylation. These undesirable results are enhanced as the temperature of the reaction is increased.

Any mineral acid or organic acid can be used to neutralize the catalyst. It is usually preferable to use strong acids, such as hydrochloric acid, sulfuric acid, benzenesulfonic acid and phosphoric acid. However, acetic acid is also quite effective. While most of these acids form water-soluble salts when neutralizing the aforementioned alkaline catalysts, sulfuric acid, for example, when used to neutralize barium hydroxide, forms a highly water-insoluble salt, but this is readily removed by filtering the solubilized product. When a polar organic solvent is used as a suspending liquid, the catalyst and neutralizing acid used should form a water-soluble salt, since this water-soluble salt will be removed in the solvent exchange partitioning step. Sodium hydroxide as catalyst and hydrochloric acid as neutralizing agent have been used together very effectively.

The suspension medium for the reaction can be any inert polar solvent in which acrylonitrile is soluble and with which acrylonitrile is not particularly reactive. The preferred polar solvents are water, alcohols, such as tertiary butyl alcohol, and ethers, such as dioxane. Primary alcohols are not desirable because they readily undergo the Michael reaction with acrylonitrile. Secondary alcohols, while not as reactive as the primary hydroxyl groups of starch, are less desirable than the more inert tertiary alcohols. Of all the polar solvents mentioned, water is most preferred because it is relatively inert and cheap.

More specifically, the cyanoethyl amylose of this invention is prepared by adding acrylonitrile to an alkaline suspension of amylose or by adding an alkaline catalyst to a reaction mixture containing acrylonitrile and amylose in suspension. If desired, the solid amylose may be added to the reaction mixture containing the acrylonitrile and alkaline catalyst. The amylose can comprise from about 1% to 20% by weight of the suspension.

When a polar organic solvent is used to suspend amylose, the reaction mixture is maintained at a temperature of from 0° C. to 78° C. for at least about one hour. The reaction mixture is neutralized to a pH of from about 6 to 8 with an acid and then the solid product is physically separated from the suspending liquor by partitioning. While filtration may be employed, the small size of the cyanoethyl amylose particles makes it more advisable to use a centrifuge. The product isolated by centrifuging is washed with water. During the washing, essentially all water-soluble impurities in the original amylose and water-soluble salts formed during the neutralization of the catalyst are removed. This water-insoluble product may be sold without further treatment to a manufacturer of films, etc., who carries out the remainder of the process.

To solubilize it, the washed, water-insoluble cyanoethyl amylose is dispersed in about 5 to about 20 times its weight of water and rapidly heated in an autoclave to about 150° C. or higher. After a short time (10 seconds to 15 minutes) at this temperature, the cyanoethyl amylose suspension is converted into a non-gelling cyanoethyl amylose aqueous solution and cooled to room temperature. Any water-insoluble solid impurities in the amylose and water-insoluble salts formed during the neutralization of the catalyst may be removed from the cyanoethyl amyolse by a second partitioning step at this point, e.g., by filtration or centrifuging.

As is apparent from the foregoing, the two partitioning steps enable us to prepare relatively pure cyanoethyl amylose from impure amylose. Likewise, these two partitioning steps permit the use of large quantities of catalyst without any salt contamination of the cyanoethyl amylose. Water-insoluble solid impurities in the amylose fraction used to make the cyanoethyl amylose of this invention and water-insoluble salts from neutralized catalyst are readily removed from the aqueous cyanoethyl amylose by partitioning. Likewise, any water-soluble impurities in the amylose and any water-soluble salts from the neutralized catalyst are easily removed in the solvent exchange partitioning step, immediately following the neutralization of the reaction mixture.

While the procedure set forth in the preceding paragraphs may be followed when water is used as the polar suspending liquor, it is preferable, when carrying out the whole process in one plant, to simplify this procedure by omitting the solvent exchange partitioning step. This step can be omitted since even crude amylose normally has relatively low concentrations of water-soluble impurities. Furthermore, at the conclusion of the acrylonitrile reaction, the reaction product is already dispersed in water, and, after neutralization of the catalyst, the dispersion is in condition for the next step. Accordingly, the neutralized aqueous suspension of cyanoethyl amylose is rapidly heated in an autoclave to a temperature of about 150° C. or higher until a non-gelling cyanoethyl amylose solution is formed. Any water-insoluble solid impurities may be removed from the cyanoethyl amylose solution by filtration of this solution.

The aqueous cyanoethylation system discussed in the preceding paragraph is dependent upon the selection of catalyst concentrations and/or the combination of catalyst and neutralizing acid to permit the omission of the solvent exchange partitioning step. As stated previously in the discussions of the catalyst and the neutralizing acid, the solvent exchange step can be advantageously omitted when the catalyst concentration is low (apparently 0.02 mole catalyst per mole of amylose up to 0.16 mole catalyst per mole of amylose) or when the catalyst and neutralizing acid are selected in such a way that they form a water-insoluble salt.

Whether water or a polar organic solvent has been used, and whether the aqueous solution produced by the high-temperature solubilization has been separated from the associated solids or not, a cold water-soluble cyanoethyl amylose powder is recovered from that solution by precipitation with an organic material, such as acetone, or by evaporating the water on hot rolls, or by spray drying, etc. On the other hand, instead of isolating the cyanoethyl amylose as a powder, a film may be cast directly from the solution.

The cyanoethyl amylose products of this invention can be classified as three distinct types which are: initially water-insoluble products, which can be rendered water-soluble at temperatures in excess of 125° C.; cold water-soluble cyanoethyl amylose; and water-soluble cyanoethyl amylose films. The initially water-insoluble cyanoethyl amylose can be separated from the cyanoethylation reaction medium in the solvent exchange partitioning step. This is a commodity of commerce, which may be used to prepare the cold water-soluble cyanoethyl amylose or cyanoethyl amylose films.

The cold water-soluble cyanoethyl amylose powders are prepared by dissolving initially water-insoluble cyanoethyl amylose, having a degree of substitution between about 0.19 and 0.88, in water at a temperature in excess of 125° C., followed either by precipitating the cyanoethyl amylose powder from solution with an organic material or by evaporating the water on hot rolls or by spray drying. The cold water-soluble cyanoethyl amylose has a degree of substitution of at least about 0.19, i.e., on an average 0.19 cyanoethyl groups on each anhydroglucose unit of amylose. When the degree of substitution is below 0.19, aqueous solutions formed by dissolving cold water-soluble cyanoethyl amylose in water or formed by heating initially water-insoluble cyanoethyl amylose in water at elevated temperatures tend to gel rapidly on cooling to room temperature. It is, accordingly, not feasible to cast films from cyanoethyl amylose having a D.S. (degree of substitution) below 0.19, since the cyanoethyl amylose solution tends to gel rapidly at room temperature. On the other hand, if the D.S. is above approximately 0.88, the bulk of the initially water-insoluble cyanoethyl amylose cannot be dissolved in water even at elevated temperatures of this invention. As a result, cold water-soluble cyanoethyl amylose having a D.S. above about 0.88 cannot be prepared in good yields.

The cold water-soluble cyanoethyl amylose having a degree of substitution between about 0.19 and 0.88 is an excellent film former, and it has little or no tendency to gel or to retrograde in aqueous solution. When deposited from solution according to this invention, the cyanoethyl amylose forms flexible, water-soluble films when plasticized with water or glycerine. These films can be used to package starch, bleach, soap and other products where it is desirable to dissolve the film packaging in water.

Because amylose is less soluble in water than starch, their derivatives might be expected to have the same relationship. Accordingly, the solubilization of initially water-insoluble cyanoethyl amylose having a D.S. of from about 0.19 to 0.88 in water at elevated temperatures is quite unexpected, since cyanoethyl starch of the same degree of substitution, which has been prepared by suspension cyanoethylation, will not dissolve, or paste, at elevated temperatures in the absence of alkali; alkali is required. Moreover, the presence of alkali is undesirable since at elevated temperatures alkali causes hydrolysis of nitrile groups as well as de-etherification of the cyanoethyl groups.

Acrylonitrile can be used in a concentration of from about 0.2 moles to 6 moles or more per mole of amylose. When amorphous amylose is cyanoethylated, the product having a D.S. between about 0.19 and about 0.88 can be solubilized by heating an aqueous suspension to about 150° C. irrespective of the concentration of acrylonitrile or catalyst. On the other hand, more care is required when crystalline amylose is cyanoethylated at the higher acrylonitrile ratios. Thus, with crystalline amylose, at a 1:1 mole ratio of acrylonitrile to amylose, the catalyst concentration may be as low as desired. However, at an acrylonitrile to amylose mole ratio of 2:1 or higher, a relatively higher catalyst concentration is desirable.

For example, with a mole ratio of acrylonitrile to amylose of 2:1 and a low catalyst concentration (0.04 mole catalyst to one mole amylose), amorphous amylose yielded a product (D.S. of about 0.8), which was readily water-soluble at 150° C.; under the same conditions, crystalline amylose (prepared by the process of Serial No. 2,160) yielded a product with about the same D.S. that was essentially water-insoluble at 150° C. When the acrylonitrile-amylose mole ratio is at 3:1 (or even at 6:1 or more), the cyanoethylated product from amorphous amylose is still readily solubilized at all degrees of substitution from 0.19 to 0.88; in contrast, under the same conditions, the product based on crystalline amylose, even at a low degree of substitution, is essentially water-insoluble at elevated temperatures.

To overcome the intractability of the product made from the crystalline form at high acrylonitrile ratios, we have found that it is necessary only to increase slightly the catalyst concentration. With increased catalyst concentration, acrylonitrile-amylose ratios of 3:1 or more can be used even with the crystalline form of amylose if desired. For example, using a mole ratio of acrylonitrile to amylose of 3:1 and a mole ratio of catalyst to amylose of 0.16:1, crystalline amylose has been cyanoethylated to a D.S. of 0.75, and this product was completely water-soluble.

The failure of cyanoethylated crystalline amylose, which has been cyanoethylated at a low catalyst concentration (order of 0.04:1) and a high acrylonitrile concentration to dissolve in water at elevated temperatures is believed to be due to the crystalline amylose being "case-hardened" by the cyanoethylation, as explained before. We believe that the slightly increased alkaline catalyst concentration serves as a penetrating agent making a larger number of free hydroxyl groups in the amylose crystal available for reaction with the acrylonitrile, and thereby preventing the case hardening. Exactly how this takes place is not clear. However, it is clear that by the proper selection of catalyst concentration, amylose of any physical form may be reacted with from 0.2 to 6 or more moles of acrylonitrile per mole of amylose to prepare an initially water-insoluble cyanoethyl amylose having a degree of substitution of from 0.19 to 0.88, which can be dissolved in water by heating to about 150° C. to form stable, non-gelling solutions.

The following examples are merely illustrative and should not be construed as limiting the scope of the invention.

EXAMPLE 1

Five hundred grams of a 10% aqueous slurry of crude crystalline corn amylose (0.31 mole) were placed in a 1,000 ml., 3-necked flask equipped with a stirrer and nitrogen inlet tube. Sixteen and thirty-three-hundredths grams of acrylonitrile (0.31 mole) were added to the slurry while it was being stirred rapidly, and after this mixture was stirred for 30 minutes, 5 ml. of a 10% by weight solution of NaOH (0.04 mole per mole amylose) was added. The pH of the suspension was 11.7. The suspension was stirred at room temperature for 21 hours under a nitrogen atmosphere during which time 10 ml. samples were removed hourly. Each of the 10 ml. samples was neutralized with .1 N HCl, centrifuged and washed with water. Part of each sample was analyzed for percent nitrogen in order to get the degree of substitution of the cyanoethyl amylose. Half of each sample was dispersed in approximately 10 ml. of water and then placed in a Carius tube (15 x 20 x 250 mm.) with the aid of a long-stemmed funnel; the tube was sealed, shaken to suspend the sample, and then heated for five minutes in a 150° C. oil bath. The results are tabulated below in Table I.

*Table I*

| Duration of reaction in hours | Degree of substitution | Appearance of neutral, undiluted cyanoethyl amylose solution after standing for six months at room temperature |
|---|---|---|
| 1 | 0.05 | White gel, which formed on cooling to room temperature. |
| 3 | 0.12 | Do. |
| 5 | 0.19 | Soft white gel, which formed after one month. |
| 7 | 0.25 | Soft white gel, which formed after six months. |
| 8 | 0.27 | Clear liquid. |
| 9 | 0.29 | Do. |
| 10 | 0.31 | Do. |
| 11 | 0.35 | Do. |
| 13 | 0.37 | Do. |
| 15 | 0.38 | Do. |
| 17 | 0.39 | Do. |
| 19 | 0.41 | Do. |
| 21 | 0.42 | Do. |

After 21 hours, 29.1 grams (not including the total weight of samples removed) of cyanotheyl amylose having a degree of substitution of 0.42 were isolated.

EXAMPLE 2

This example illustrates that when the ratio of acrylonitrile to crystalline amylose is 3:1 and the mole ratio of catalyst to crystalline amylose is 0.04:1, the products formed by cyanoethylation are water-insoluble at elevated temperatures. Example 1 was repeated using 48.99 grams of acrylonitrile (0.93 mole) instead of 16.33 grams of acrylonitrile (0.31 mole). The results are tabulated below in Table II.

*Table II*

| Duration of reaction in hours | Degree of substitution | Water solubility of cyanoethyl amylose at 150° C. |
|---|---|---|
| 1 | 0.12 | Water-insoluble. |
| 3 | 0.22 | Do. |
| 5 | 0.50 | Do. |
| 7 | 0.65 | Do. |
| 9 | 0.75 | Do. |
| 11 | 0.78 | Do. |
| 13 | 0.83 | Do. |
| 15 | 0.85 | Do. |
| 17 | 0.88 | Do. |
| 19 | 0.85 | Do. |
| 21 | 0.90 | Do. |

After 21 hours 32.1 grams (not including the total weight of samples removed) of cyanoethyl amylose having a degree of substitution of 0.90 were isolated.

EXAMPLE 3

This example illustrates the use of a catalyst concentration of 0.08 mole to one mole amylose. One hundred and sixty-two grams of a 10% aqueous slurry of crude crystalline corn amylose (0.1 mole) was placed in 500 ml., 3-necked flask equipped with a stirrer and nitrogen inlet tube. Five and three-tenths grams of acrylonitrile (0.1 mole) were added to the slurry while it was being stirred rapidly. After this mixture was stirred for 30 minutes, 3.24 ml. of .1 g. per ml. of NaOH (0.08 mole per mole amylose) was added. The suspension was stirred at room temperature for 23 hours under a nitrogen atmosphere during which time 10 ml. samples were removed at intervals. The samples were treated as described in Example 1. Eighteen and two-tenths grams of cyanoethyl amylose was isolated after 23 hours. The results are tabulated below in Table III.

*Table III*

| Duration of reaction in hours | Degree of substitution | Appearance of neutral, undiluted cyanoethyl amylose solution after one month at room temperature |
|---|---|---|
| 1 | 0.13 | Gelled on cooling to room temperature. |
| 3 | 0.24 | Clear liquid. |
| 5 | 0.33 | Do. |
| 23 | 0.55 | Do. |

EXAMPLE 4

Example 3 was repeated using 0.16 moles of NaOH per mole of amylose. Yield was 17.9 grams. The results are tabulated below in Table IV.

*Table IV*

| Duration of reaction in hours | Degree of substitution | Appearance of neutral, undiluted cyanoethyl amylose solution after one month at room temperature |
|---|---|---|
| 1 | 0.20 | Clear liquid. |
| 3 | 0.33 | Do. |
| 5 | 0.36 | Do. |
| 23 | 0.32 | Do. |

EXAMPLE 5

Example 3 was repeated with the reaction vessel thermostated at 45° C. in a water bath instead of at room temperature. Yield was 16.7 grams. The results are tabulated below in Table V.

*Table V*

| Duration of reaction in hours | Degree of substitution | Appearance of neutral, undiluted cyanoethyl amylose solution after one month at room temperature |
|---|---|---|
| 1 | 0.19 | Clear liquid. |
| 2 | 0.32 | Do. |
| 3 | 0.35 | Do. |
| 4 | 0.38 | Do. |
| 24 | 0.30 | Do. |

EXAMPLE 6

Eight thousand one hundred grams of a 10% aqueous slurry of crude crystalline corn amylose (5 moles) were placed in a 10 liter, 3-necked flask equipped with a stirrer and nitrogen inlet tube. Two hundred and sixty-five grams of acrylonitrile (5 moles) were added to the slurry while it was stirred rapidly, and after this mixture was stirred for 30 minutes, 8.1 grams of NaOH (0.04 mole per mole amylose) was added as 80 ml. of .11 g. per ml. solution. The suspension was stirred at room temperature for 24 hours under a nitrogen atmosphere and then neutralized with 3 N HCl. A 5% aqueous slurry of the cyanoethyl amylose was prepared. Approximately one-half of this 5% slurry was autoclaved in a continuous autoclave for five minutes at 150° C. to give a hazy solution, which did not gel when cooled to room temperature. A portion of this autoclaved solution was spray dried to give a cold water-soluble product, which had a degree of substitution of 0.48. A portion of the cyanoethyl amylose, which had not been autoclaved, was isolated by centrifuging and then dried. This product, which had a degree of substitution of 0.50, was cold water-insoluble. A second portion of the cyanoethyl amylose, which had not been autoclaved, was spray dried. The spray dried cyanoethyl amylose had a degree of substitution of 0.50 and was insoluble in cold water.

EXAMPLE 7

One hundred and sixty-two grams of a 10% aqueous slurry of amorphous potato amylose (0.1 mole) were placed in a 500 ml., 3-necked flask equipped with a stirrer and nitrogen inlet tube. Five and three-tenths grams of acrylonitrile (0.1 mole) were added to the suspension. After stirring for 30 minutes, 1.62 ml. of 0.1 g. per ml. of NaOH (.04 mole per mole amylose) was added. After stirring for 24 hours at room temperature, the suspension was neutralized to pH 6.5 with 3 N HCl. The cyanoethyl amylose was separated from the suspending liquid by centrifuging, and then washed three times with distilled water and once with acetone. Eighteen grams of solid, having a degree of substitution of 0.33, was isolated by drying in a vacuum oven at 80° C. overnight. This material formed a stable 5% solution after being autoclaved at 150° C. for five minutes.

EXAMPLE 8

Example 7 was repeated using spray dried corn amylose instead of amorphous amylose. The isolated solid cyanoethyl amylose weighed 16 grams and had a degree of substitution of 0.30. Autoclaving with water at 150° C. for five minutes gave a stable 5% solution, which did not gel on cooling to room temperature.

EXAMPLE 9

Example 8 was repeated using 2.272 ml. of 0.1 g. per ml. KOH (0.04 moles per mole amylose) as a catalyst in place of NaOH. The isolated product weighed 17.1 grams and had a degree of substitution of 0.33. Autoclaving with water at 150° C. for five minutes gave a stable 5% solution, which did not gel on cooling to room temperature.

EXAMPLE 10

One hundred and sixty-two grams of a 10% aqueous slurry of amorphous potato amylose (0.1 mole) was placed in a 500 ml., 3-necked flask equipped with a stirrer and nitrogen inlet tube. Ten and six-tenths grams of acrylonitrile (.2 mole) were added to the slurry, while it was being stirred rapidly. After this mixture was thermostated at 45° C. in a water bath and stirred for 30 minutes, 1.65 ml. of .1 g. per ml. of NaOH (0.04 mole per mole amylose) was added. The suspension was stirred at 45° C. for 24 hours under a nitrogen atmosphere during which time 10 ml. samples were removed at intervals. The samples were treated as described in Example 1. Sixteen and four-tenths grams of cyanoethyl amylose was isolated after 24 hours. The results are tabulated below in Table VI.

*Table VI*

| Duration of reaction in hours | Degree of substitution | Appearance of neutral, undiluted cyanoethyl amylose solution after one month at room temperature |
|---|---|---|
| 1 | 0.24 | Clear liquid. |
| 2 | 0.47 | Do. |
| 3 | 0.53 | Do. |
| 24 | 0.81 | Do. |

EXAMPLE 11

This example illustrates that when the ratio of acrylonitrile to crystalline amylose is 3:1 and the mole ratio of catalyst to crystalline amylose is 0.16:1, the products formed by cyanoethylation are water-soluble at elevated temperatures. One hundred and eighty grams of a 9% aqueous slurry of crude crystalline corn amylose (0.1 mole) were placed in 500 ml., 3-necked flask equipped with a stirrer and nitrogen inlet tube. Fifteen and nine-tenths grams of acrylonitrile (0.3 mole) were added to the slurry while it was being stirred rapidly, and after this mixture was stirred for 30 minutes, 20 ml. of a 10% by weight solution of NaOH (0.16 mole per mole of amylose) was added. The suspension was stirred at room temperature for 3 hours under a nitrogen atmosphere during which time 10 ml. samples were removed hourly. These samples were treated as described in Example 1. The results are tabulated below in Table VII.

*Table VII*

| Duration of Reaction in hours | Degree of substitution | Appearance of neutral, undiluted cyanoethyl amylose after heating to 150° C. and cooling to room temperature |
|---|---|---|
| 1 | 0.47 | Clear liquid. |
| 2 | 0.75 | Do. |
| 3 | 0.92 | Did not go in solution at 150° C. |

Since many embodiments of this invention can be made and since many changes can be made in the embodiments described, the foregoing is to be interpreted as illustrative only and our invention is defined by the claims appended hereafter.

We claim:

1. A readily isolable cyanoethyl amylose having a degree of substitution of between about 0.19 and 0.88, which is substantially water-insoluble at temperatures up to 125° C., and which forms at temperatures in the range of about 125° C. to about 200° C. and within times less than those at which degradation occurs an aqueous solution, which neither gels nor retrogrades on subsequent cooling to room temperature.

2. The method of preparing a cyanoethyl amylose, which comprises the steps of reacting an alkaline suspension of amylose with at least 0.2 mole of acrylonitrile per mole of amylose while maintaining the amylose in suspension, neutralizing the suspension and isolating the undissolved cyanoethyl amylose, where the suspending liquid is a solvent for acrylonitrile.

3. The method of claim 2 where the suspending liquid is water.

4. The method of preparing a cold water-soluble cyanoethyl amylose, which comprises the steps of reacting an alkaline suspension of amylose with at least 0.2 mole of acrylonitrile per mole of amylose, wherein the suspending liquid is a solvent for acrylonitrile, neutralizing said alkaline suspension, partitioning off the insoluble cyanoethyl amylose from the suspending liquid, dispersing the cyanoethyl amylose in water, heating the cyanoethyl amylose dispersion to a temperature of from about 125° C. to 200° C. until the cyanoethyl amylose goes into solution and then recovering the cyanoethyl amylose as a cold water-soluble powder.

5. The method of preparing a cold water-soluble cyanoethyl amylose, which comprises the steps of reacting an alkaline, aqueous suspension of amylose with at least about 0.2 mole of acrylonitrile per mole of amylose, neutralizing said alkaline suspension, heating the suspension to a temperature of from about 125° C. to 200° C. until the cyanoethyl amylose goes into solution and then recovering the cyanoethyl amylose as a cold water-soluble powder.

6. The method of preparing a cyanoethyl amylose film, which comprises the steps of reacting an alkaline suspension of amylose with at least about 0.2 mole of acrylonitrile per mole of amylose, wherein the suspending liquid is a solvent for acrylonitrile, neutralizing said alkaline suspension, partitioning off the insoluble cyanoethyl amylose from the suspending liquid, dispersing the cyanoethyl amylose in water, heating the cyanoethyl amylose dispersion to a temperature of from about 125° C. to 200° C. until the cyanoethyl amylose goes into solution and then casting said solution into a film.

7. The method of preparing a cyanoethyl amylose film, which comprises the steps of reacting an alkaline, aqueous suspension of amylose with at least about 0.2 mole of acrylonitrile per mole of amylose, neutralizing said alkaline suspension, heating the suspension to a temperature of from about 125° C. to 200° C. until the cyanoethyl amylose goes into solution and then casting said solution into a film.

8. The method of preparing cyanoethyl amylose, which comprises the steps of reacting an alkaline suspension of amylose with at least 0.2 mole of acrylonitrile per mole of amylose while maintaining the amylose in suspension, and isolating cyanoethyl amylose, where the suspending liquid is a solvent for acrylonitrile.

9. A cold water-soluble cyanoethyl amylose prepared by dissolving the product of claim 1 in water at a temperature in excess of 125° C. and recovering the cyanoethyl amylose as a cold water-soluble material.

References Cited by the Examiner

UNITED STATES PATENTS

| | | | |
|---|---|---|---|
| 2,608,723 | 9/52 | Wolff et al. | 18—57 |
| 2,656,571 | 10/53 | Davis et al. | 18—57 |
| 2,763,627 | 9/56 | Hagemeyer | 260—233.3 |
| 2,822,581 | 2/58 | Muetgeert et al. | 18—57 |
| 2,965,632 | 12/60 | Paschall et al. | 260—233.3 |
| 3,038,895 | 6/62 | Rutenberg et al. | 260—233.3 |

OTHER REFERENCES

Wolff et al., "Industrial and Engineering Chemistry," volume 43, No. 4, January–April 1951, pages 911–919.

LEWIS GOTTS, *Primary Examiner.*

ABRAHAM H. WINKELSTEIN, CHARLES B. PARKER, *Examiners.*